United States Patent [19]

Meyer et al.

[11] 4,171,419
[45] Oct. 16, 1979

[54] CARTRIDGE FOR SECURING STAY BARS IN BORE HOLES CONTAINING A POLYISOCYANATE COMPONENT IN ONE COMPARTMENT AND A POLYOL CONTAINING TERTIARY AMINE NITROGEN IN ANOTHER COMPARTMENT

[75] Inventors: Frank Meyer, Essen; Rolf Kubens, Odenthal; Martin Winkelmann, Leverkusen, all of Fed. Rep. of Germany

[73] Assignees: Bergwerksverband GmbH, Essen; Bayer Aktiengesellschaft, Leverkusen, both of Fed. Rep. of Germany

[21] Appl. No.: 875,038

[22] Filed: Feb. 3, 1978

[30] Foreign Application Priority Data

Feb. 11, 1977 [DE] Fed. Rep. of Germany ....... 2705751

[51] Int. Cl.$^2$ ............................................. C08G 18/32
[52] U.S. Cl. ..................................... 528/67; 521/129; 528/78; 528/85
[58] Field of Search ................. 260/77.5 AQ, 2.5 AQ; 528/67, 78, 85; 521/129

[56] References Cited

U.S. PATENT DOCUMENTS 3,277,027  10/1966  Hennig et al. ............... 260/77.5 AQ
3,792,023   2/1974  Havenith et al. ............ 260/77.5 AQ

FOREIGN PATENT DOCUMENTS 1275941  6/1972  United Kingdom ............. 260/77.5 AP

*Primary Examiner*—Maurice J. Welsh
*Attorney, Agent, or Firm*—Gene Harsh; Lawrence S. Pope; Frederick H. Colen

[57] ABSTRACT

The present invention relates to a two-compartment cartridge which is suitable for securing stay bars in bore holes by means of polyurethane resins and which is destructible by the stay bar, containing a polyisocyanate component on the one hand and a polyol component on the other hand, distinguished by the fact that the polyisocyanate component used is an aromatic polyisocyanate or a mixture of aromatic polyisocyanates, while the polyol component used is a polyol containing tertiary amine nitrogen and having a molecular weight of from about 119 to 3000 or a polyol mixture containing at least one such polyol. The present invention also relates to a process for securing stay bars in bore holes by introducing into the bore hole a two-compartment cartridge which contains components capable of forming a synthetic resin and which is destructible by driving in the stay bar and subsequently driving in the stay bar, distinguished by the fact that a cartridge of the type described above is used as the two-compartment cartridge.

9 Claims, No Drawings

CARTRIDGE FOR SECURING STAY BARS IN BORE HOLES CONTAINING A POLYISOCYANATE COMPONENT IN ONE COMPARTMENT AND A POLYOL CONTAINING TERTIARY AMINE NITROGEN IN ANOTHER COMPARTMENT

FIELD OF THE INVENTION

This invention relates to a cartridge for securing stay bars in bore holes by means of polyurethane resins.

BACKGROUND OF THE INVENTION

It is known that stay bars may be secured in bore holes by means of polyester resins. Other resins which have been proposed for this purpose are polyurethane resins. The components from which these polyurethanes are formed are contained in a two-compartment cartridge, a polyisocyanate being contained in one of the compartments and a polyol in the other compartment. By destroying the cartridge with the stay bar introduced by rotation into the bore hole, the two components are intimately mixed to form the polyurethane. However, the rate at which this reaction progresses until complete hardening is obtained is very slow so that, after destruction of the cartridge and intensive mixing, the resin only gels after about 2 hours and only hardens after from about 5 to 6 hours (German Auslegeschrift No. 1,205,038 and British Patent No. 1,275,941). This long hardening time is a disadvantage so far as the installation of stays is concerned because the stay in question cannot, as desired, be immediately subjected to loads.

Although it would be possible to reduce the hardening time of polyurethane resins by adding accelerators to the polyol component, this measure would be attended by other disadvantages. On the one hand, the hardening time is dependent to a very large extent upon the quantity of accelerator used so that by adding small quantities of accelerators, for example certain organometallic compounds, it would only be possible to obtain an insignificant reduction in the hardening time. When relatively large quantities of accelerator are added, however, it has been found that these compounds undergo considerable decomposition and, as a result, soon lead, for example after storage for a few weeks, to the ineffectiveness of the cartridges outweighing the short hardening time required.

An object of the present invention is to enable stay bars to be secured in bore holes by means of polyurethane resins which harden extremely quickly, the gelling and hardening time together actually amounting to less than about 1 minute.

According to the present invention, this object is achieved by virtue of the fact that a polyol or mixture of polyols containing tertiary amine nitrogen of the type described in detail below is used as the polyol component in a two-compartment cartridge.

SUMMARY OF THE INVENTION

Accordingly, the present invention relates to a two-compartment cartridge which is suitable for securing stay bars in bore holes by means of polyurethane resins and which is destructible by the stay bar, containing a polyisocyanate component on the one hand and a polyol component on the other hand, distinguished by the fact that the polyisocyanate component used is an aromatic polyisocyanate or a mixture of aromatic polyisocyanates while the polyol component used is a polyol containing tertiary amine nitrogen and having a molecular weight of from about 119 to 3000 or a polyol mixture containing at least one such polyol.

The present invention also relates to a process for securing stay bars in bore holes by introducing into the bore hole a two-compartment cartridge which contains components capable of forming a synthetic resin and which is destructible by driving in the stay bar and subsequently driving in the stay bar, distinguished by the fact that a cartridge of the type described above is used as the two-compartment cartridge.

DETAILED DESCRIPTION OF THE INVENTION

The polyisocyanate component used in accordance with the present invention is an aromatic polyisocyanate or a mixture of several aromatic polyisocyanates. Suitable aromatic polyisocyanates are any polyisocyanates which are liquid at room temperature and which contain aromatically bound isocyanate groups, such as 2,4-diisocyanatotoluene and 2,6-diisocyanatotoluene or the phosgenation products of aniline/formaldehyde condensates. These phosgenation products are particularly preferred. The products in question are polyisocyanate mixtures which, in addition to 4,4'-diisocyanatodiphenyl methane, contain isomers and higher homologues of this diisocyanate. In general, these mixtures contain from about 20 to 100%, by weight, of diisocyanatodiphenyl methane isomers, from about 0 to 80%, by weight, of trinuclear triisocyanates and from about 0 to 50%, by weight, of polyisocyanates having 4 and more nuclei. In approximate terms, therefore, these polyisocyanate mixtures may be described by the following formula wherein n represents 0 or an integer of from 1 to 4:

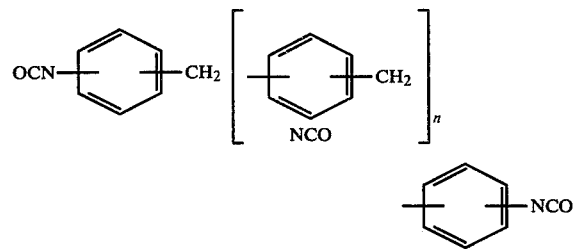

The preferred polyisocyanate component has a viscosity of about 10 to about 1000 mPa.s at 25° C. and an NCO content of about 28 to 33.6% by weight.

The polyol component used in accordance with the present invention preferably consists of polyhydroxyl compounds containing tertiary amine nitrogen and, optionally, ether groups and having aliphatically bound hydroxyl groups having an OH-functionality of from 2 to 4 and a molecular weight of from about 119 to 3000, preferably from about 149 to 1000, or of a polyol mixture which contains at least one such polyol containing tertiary amine nitrogen, having an average OH-number of from about 60 to 1600, preferably from about 200 to 1200, and which, in addition to the above-mentioned polyols containing tertiary amine nitrogen, preferably contain nitrogen-free aliphatic polyols or polyether polyols having a molecular weight of from about 62 to 3000, preferably from about 100 to 1000. The polyol component used in accordance with the present invention contains from about 0.4 to 12%, by weight, preferably from about 1.5 to 10%, by weight, of tertiary amine nitrogen.

Suitable polyols containing tertiary amine nitrogen are, for example, simple polyols containing tertiary amine nitrogen, such as N-methyl diethanolamine, triethanolamine, N-methyl dipropanolamine, tripropanolamine or even aliphatic polyether polyols having built-in tertiary amine nitrogen of the type which may be obtained in known manner by alkoxylating suitable starter molecules. Suitable starter molecules in this connection are, for example, ammonia, hydrazine, ethylene diamine, hydroxylamine, methylamine, triethanolamine, tripropanolamine or hexamethylene diamine. Alkylene oxides suitable for producing the nitrogen-containing polyether polyols are, in particular, ethylene oxide and/or propylene oxide. The polyether polyols containing tertiary amine nitrogen are produced by known methods (cf. Ullmann's Enzyklopadie der Chemie, Vol. 14, 3rd Edition, 1963, pages 50 to 52).

Suitable nitrogen-free polyols, optionally present in admixture, are, for example, simple, preferably aliphatic, polyols, such as ethylene glycol, propylene glycol, trimethylol propane or glycerol, or even nitrogen-free polyether polyols, such as the alkoxylation products of suitable nitrogen-free starter molecules, such as water, ethylene glycol, trimethylol propane or pentaerythritol. It is also possible, in principle, to use polyether polyols having a functionality of more than 4 such as, in particular, sugar polyethers produced by alkoxylating cane sugar.

The quantitative ratio in which the polyols and the polyisocyanates are accommodated in the individual compartments of the two-component cartridge may be varied within wide limits. However, the polyisocyanate is preferably present in such a quantity that, for every reactive hydrogen atom of the polyols in one compartment, there are from about 0.5 to 2 NCO-groups in the polyisocyanate contained in the other compartment. In practice, this generally means a ratio by weight, of isocyanate to polyol of from about 3:1 to 1:4. Preferably the polyisocyanate is present in such a quantity that for every reactive hydrogen atom from about 0.7 to 1.6 NCO-groups are available.

The known reactivity of polyisocyanates with water has also proved to be of considerable advantage in the cartridges according to the present invention. For example, the surface of the stay bar may be moist or the bore hole may be wet. In both cases, the moisture present is quickly consumed by the known reaction of water with polyisocyanate so that, even in a moist medium, a firm bond is formed between the stay bar, the wall of the bore hole and the composite body formed in the annular space. This result is not obtained with the widely used polyester resins because they are sensitive to water and do not enter into any bond with water.

It is advantageous to add up to about 0.5%, by weight, preferably from about 0.1 to 0.3%, by weight, of water to the polyols, whereby limited foaming occurs when the components are mixed so that the resin hardens with an increase in volume. This is a major advantage because, even if the annular space is relatively large, as for example in the case of dug-out bore holes, the polyurethane thus always completely fills the annular space. The polyurethane body is unlikely to become detached from the wall of the bore hole by shrinkage. By virtue of the increase in volume, the resin body fills not only all the cavities of the bore hole, but also penetrates into the gaps and fissures in the wall of the bore hole and, in doing so, not only produces a bond, but also provides for proper gripping of the composition body between stay and rock.

To ensure that the hardened resin has a certain elasticity which is often desired, plasticizers, for example castor oil, may be added to the polyol in quantities of up to about 20%, by weight, preferably from about 1 to 5%, by weight. Long polyether polyols having a low OH-number of from about 20 to 100 are also suitable for use as flexibilizing agents.

Furthermore, it is advantageous so far as the strength of the bond is concerned to add fillers, for example crushed rock or quartz powder, to one or both components so that a type of polyurethane concrete is formed. The fillers may be added in quantities of from about 10 to 80%, by weight, although they are preferably added in quantities of from about 20 to 70%, by weight, based on the resin formed.

Since the polyurethanes always harden in a few seconds after mixing, with the result that the stay bar introduced is almost immediately bonded to the wall of the bore hole, anchoring using cartridges according to the present invention may be carried out by means of automatic boring and jigging machines.

Another advantage of the rapid gelation and hardening of the polyurethanes is manifested when the cartridges are used for anchoring in upwardly directed bore holes because the resin is unable to run out of the bore hole, thereby avoiding losses of material and danger to personnel.

One particular advantage is that the polyurethane bodies formed using amine-started polyols show improved adhesion both to the rock and also to the stay bar. This advantage is of considerable importance in practice insofar as, on the one hand, the stay bars are able to withstand greater tractive forces and, on the other hand, bonds of shorter length are sufficient for bonding the stay to the rock up to its breaking load. In this context the "breaking load" is the tractive load necessary either to break the stay bar or the bond of the bar to the rock. In the case of the adhesives of the invention it can often be observed that the breaking load of the bond is higher than the solidity of the bar.

In following examples "t" stands for metric tons. The tractive load in the examples was applied one hour after the destruction of the cartridge.

EXAMPLES

EXAMPLE 1

The cartridge used was in the form of a glass cylinder having a wall thickness of 1 mm, an internal diameter of 2.6 cm and a length of 60 cm which was filled with 210 g of a polyisocyanate mixture of the diphenyl methane series having a viscosity of 100 cP/25° C. and an NCO-content of 32%, by weight, produced by phosgenating an aniline/formaldehyde condensate and adjusting the above-mentioned viscosity by distilling off diisocyanatodiphenyl methane isomers from the phosgenation product. The internal cartridge was in the form of a glass tube having a length of 59 cm, an internal diameter of 1.6 cm and a wall thickness of 1 mm which was filled with 125 g of a polyol produced from ethylene diamine and propylene oxide having an OH-number of 625.

The cartridge closed by a plastic plug was introduced into a bore hole 30 mm in diameter and, at a rotational speed of 300 rpm, was destroyed by a stay bar 24 mm in diameter provided at its lower end with spiral ribs, whereby the components were mixed. The gel time was 40 seconds.

After 50 seconds, a load of 4 t was applied to the stay bar. For a bond length of 100 cm, the stay bar could be withdrawn from the bore hole under a tractive load of 22 t.

EXAMPLE 2

The cartridge used was in the form of a flexible polyamide tube 2.8 cm in diameter and 60 cm long which was clipped at both ends after filling with 420 g of a polyisocyanate mixture of the diphenyl methane series, corresponding to the above polyisocyanate mixture, having an NCO-content of 30.5%, by weight, and a viscosity of 200 cP/25° C. and crushed rock in a weight ratio, by weight, of 1:2. The internal cartridge was in the form of a glass tube having a length of 59 cm, an internal diameter of 1.6 cm and a wall thickness of 0.8 mm which was filled with 102 g of a polyol produced from ethylene diamine and propylene oxide having an OH-number of 680. The size of the bore hole and the stay bar were the same as in Example 1.

After the cartridge had been destroyed and the components mixed, breakage between the polyurethane body and the stay bar occurred under a tractive load of 26 t for a bond length of 100 cm.

EXAMPLE 3

The cartridge used was the same as in Example 2. The dimensions of the bore hole and stay bar also corresponded to Example 1. In a wet bore hole, the stay bar broke under a tractive load of 25.5 t for a bond length of 100 cm.

EXAMPLE 4

The cartridge used was in the form of a glass cylinder having a length of 60 cm, an internal diameter of 2.8 cm and a wall thickness of 0.7 mm which was filled with 420 g of a mixture of a polyisocyanate mixture of the diphenyl methane series having an NCO-content of 33%, by weight, and a viscosity of 80 cP/25° C. and crushed rock in a weight ratio of about 1:2. An internal cartridge of glass having a length of 59 cm, an internal diameter of 1.25 cm and a wall thickness of 0.7 mm contained 66 g of a mixture of 10%, by weight, of castor oil, 40%, by weight, of triethanolamine (OH-number 1122) and 50%, by weight, of crushed rock.

The bore hole and stay bar corresponded to Example 1. The stay bar broke under a tractive load of 28 t for a bond length of 100 cm.

EXAMPLE 5

The cartridge used was in the form of a flexible polyethylene tube 59 cm long and 2.8 cm in diameter which was filled with 420 g of the polyisocyanate mixture of Example 4 and crushed rock in a weight ratio of about 1:2.

The internal cartridge of glass had a length of 57 cm, an internal diameter of 1.65 cm and a wall thickness of 0.5 mm and was filled with 110 g of a mixture of 30% of a polyether polyol produced from triethanolamine and propylene oxide having an OH-number of 60 and 70% of a polyol produced from ethylene diamine and propylene oxide having an OH-number of 680.

For the same dimensions of the bore hole and stay bar as in Example 1, the stay bar broke under a tractive load of 29 t for a bond length of 100 cm.

EXAMPLE 6

The cartridge used was in the form of a tube 2.8 cm in diameter, 60 cm long and 1.1 mm thick was produced from an extrudable carbon/plastic mixture which consisted of 70%, by weight, of coal dust, 8%, by weight, of low molecular weight polyethylene and 22%, by weight, of high molecular weight polyethylene and was filled with 45 g of a mixture of a polyisocyanate mixture of the diphenyl methane series having an NCO-content of 33%, by weight, and a viscosity of 80 cP/25° C. and crushed rock in a weight ratio of about 1:2. The internal cartridge was a tube of the same carbon/plastic mixture having a length of 59 cm and an internal diameter of 1.6 cm which was filled with 98 g of a mixture of polyol produced from ethylene diamine and propylene oxide having an OH-number of 670 to which 0.3 g of water had been added.

The dimensions of the bore hole and stay bar corresponded to Example 1. For a bond length of 100 cm, the stay bar broke under a tractive load of 26 t.

EXAMPLE 7

The cartridge used was in the form of a glass tube having a length of 20 cm and an external diameter of 2.8 cm which was filled with 140 g of the polyisocyanate mixture of Example 2 and crushed rock in a ratio, by weight, of 1:2. The internal cartridge was in the form of a glass tube having a length of 19 cm, an internal diameter of 1.8 cm and a wall thickness of 0.8 mm which was filled with 34 g of polyol produced from ethylene diamine and propylene oxide having an OH-number of 660 and 10 g of crushed rock.

For a bond length of 18 cm, the stay bar could be withdrawn from the bore hole under a tractive load of 23 t.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed:

1. A two-compartment cartridge which is suitable for securing stay bars in bore holes and which is destructible by the stay bar, containing a polyisocyanate component in one compartment and a polyol component in the other compartment, wherein the polyisocyanate component used comprises an aromatic polyisocyanate or a mixture of aromatic polyisocyanates, and the polyol component used comprises a polyol containing tertiary amine nitrogen and having a molecular weight of from about 119 to 1,000 or a polyol mixture containing at least one such polyol.

2. A two-compartment cartridge as claimed in claim 1, wherein for every reactive hydrogen atom of the polyols contained in the one-compartment there are from about 0.5 to 2 NCO groups in the polyisocyanate contained in the other compartment.

3. A two-compartment cartridge as claimed in claim 1, wherein up to about 0.5%, by weight, of water is added to the polyols.

4. A two-compartment cartridge as claimed in claim 1, wherein up to about 20%, by weight, of a plasticizer is added to the polyols.

5. A two-compartment cartridge as claimed in claim 1, wherein fillers are added to the polyol, to the isocyanate or to both the polyol and the polyisocyanate.

6. A process for securing stay bars in bore holes comprising introducing into a bore hole a two-compartment cartridge which contains components capable of forming a synthetic resin and which is destructible by driving in the stay bars and subsequently driving in the stay bar, wherein a two-compartment cartridge of the type claimed in claim 1 is used as the two-compartment cartridge.

7. The two-compartment cartridge of claim 1 wherein the polyol component contains from about 0.4 to 12% by weight of tertiary amine nitrogen.

8. The two-compartment cartridge of claim 1 wherein the polyol component comprises a polyhydroxyl compound containing tertiary amine nitrogen having aliphatically bound hydroxyl groups, having an OH-functionality of from 2 to 4 and having a molecular weight of from about 149 to 1,000.

9. The two-compartment cartridge of claim 1 wherein the polyisocyanate component and the polyol component harden upon contact with each other in less than about one minute.

* * * * *